(12) United States Patent
Jones et al.

(10) Patent No.: US 7,858,562 B2
(45) Date of Patent: Dec. 28, 2010

(54) POWDER COMPOSITION

(75) Inventors: Timothy Gareth John Jones, Cottenham (GB); Gary John Tustin, Sawston (GB)

(73) Assignee: Schlumberger Technology Corporation, Ridgefield, CT (US)

( * ) Notice: Subject to any disclaimer, the term of this patent is extended or adjusted under 35 U.S.C. 154(b) by 698 days.

(21) Appl. No.: 11/789,313

(22) Filed: Apr. 24, 2007

(65) Prior Publication Data

US 2007/0197400 A1 Aug. 23, 2007

Related U.S. Application Data

(62) Division of application No. 10/250,414, filed on Dec. 29, 2003, now Pat. No. 7,238,649.

(51) Int. Cl.
*C09K 8/92* (2006.01)
*C08J 3/12* (2006.01)
*C08L 31/00* (2006.01)

(52) U.S. Cl. .................. 507/260; 507/240; 507/241; 507/244; 507/246; 507/267; 507/269; 524/814; 252/71

(58) Field of Classification Search .................. None
See application file for complete search history.

(56) References Cited

U.S. PATENT DOCUMENTS

| | | | | |
|---|---|---|---|---|
| 2,877,848 A | * | 3/1959 | Case | 166/305.1 |
| 3,684,720 A | * | 8/1972 | Richardson | 507/241 |
| 3,793,218 A | * | 2/1974 | Canaveri | 516/63 |
| 4,432,881 A | | 2/1984 | Evani | |
| 4,556,495 A | * | 12/1985 | Shaw | 507/263 |
| 4,561,501 A | * | 12/1985 | Shaw et al. | 166/270.1 |
| 4,607,700 A | | 8/1986 | Duerksen et al. | |
| 4,630,679 A | | 12/1986 | Reeves et al. | 166/305.1 |
| 4,725,372 A | * | 2/1988 | Teot et al. | 507/129 |
| 4,828,721 A | | 5/1989 | Bollier et al. | |
| 5,183,112 A | * | 2/1993 | Paul et al. | 166/312 |
| 5,258,137 A | | 11/1993 | Bonekamp et al. | |
| 5,536,430 A | | 7/1996 | Fues et al. | |
| 5,551,516 A | | 9/1996 | Norman et al. | |
| 5,962,397 A | | 10/1999 | Ridyard et al. | |
| 5,964,295 A | | 10/1999 | Brown et al. | |
| 5,979,557 A | | 11/1999 | Card et al. | |
| 5,981,446 A | * | 11/1999 | Qiu et al. | 507/209 |
| 6,035,936 A | | 3/2000 | Whalen | |
| 6,194,356 B1 | | 2/2001 | Jones et al. | |
| 6,232,274 B1 | | 5/2001 | Hughes et al. | |
| 6,433,075 B1 | | 8/2002 | Davies et al. | |
| 6,881,709 B2 | | 4/2005 | Nelson et al. | |
| 6,920,928 B1 | | 7/2005 | Davies et al. | |
| 7,156,177 B2 | | 1/2007 | Jones et al. | |
| 7,196,041 B2 | | 3/2007 | Jones et al. | |
| 7,343,978 B2 | | 3/2008 | Jones et al. | |
| 2002/0004464 A1 | | 1/2002 | Nelson et al. | |
| 2004/0011527 A1 | | 1/2004 | Jones et al. | |
| 2004/0053789 A1 | | 3/2004 | Jones et al. | |
| 2004/0067855 A1 | | 4/2004 | Hughes et al. | |
| 2007/0119593 A1 | | 5/2007 | Jones et al. | |
| 2007/0197404 A1 | | 8/2007 | Jones et al. | |

FOREIGN PATENT DOCUMENTS

| | | |
|---|---|---|
| EP | 0835983 A3 | 4/1998 |
| GB | 2332223 B | 1/2000 |
| GB | 2332224 B | 1/2000 |
| GB | 2335680 B | 5/2000 |
| GB | 2335679 B | 9/2000 |
| GB | 2365464 B | 9/2002 |
| GB | 2371316 B | 11/2002 |
| GB | 2365427 B | 4/2003 |
| GB | 2385589 A | 8/2003 |
| WO | 9203482 A2 | 3/1992 |
| WO | 9856497 A1 | 12/1998 |
| WO | WO 9856497 A1 * | 12/1998 |
| WO | 9932572 A1 | 7/1999 |
| WO | 9950529 A1 | 10/1999 |
| WO | 9950530 A1 | 10/1999 |
| WO | WO 9950529 A1 * | 10/1999 |
| WO | 0118147 A1 | 3/2001 |
| WO | 0177487 A3 | 10/2001 |
| WO | 0211873 A1 | 2/2002 |
| WO | 0211874 A1 | 2/2002 |
| WO | 0212673 A1 | 2/2002 |

OTHER PUBLICATIONS

Chang et al, "Case study of a novel acid-diversion technique in carbonate reservoirs", SPE Annual Technical Conference and Exhibition, Houston, Texas, Oct. 3-6, 1999, SPE 56529.

Raney, "Surfactant requirements for compact powder detergents", Powdered Detergents, Surfactant Science Series, Marcel Dekker, New York, vol. 71, 1998, pp. 241-284.

\* cited by examiner

*Primary Examiner*—James Seidleck
*Assistant Examiner*—John J Figueroa
(74) *Attorney, Agent, or Firm*—James McAleenan; Vincent Loccisano; Brigid Laffey (57) ABSTRACT

A powder composition comprising viscoelastic surfactant forms, in aqueous solution, a viscoelastic wellbore treatment fluid.

20 Claims, 9 Drawing Sheets
(7 of 9 Drawing Sheet(s) Filed in Color)

POWDER COMPOSITION

FIELD OF THE INVENTION

The present invention relates to powder compositions for forming viscoelastic wellbore treatment fluids.

BACKGROUND OF THE INVENTION

In the recovery of hydrocarbons, such as oil and gas, from natural hydrocarbon reservoirs, extensive use is made of wellbore treatment fluids such as drilling fluids, completion fluids, work over fluids, packer fluids, fracturing fluids, conformance or permeability control fluids and the like.

In many cases significant components of wellbore fluids are thickening agents, usually based on polymers or viscoelastic surfactants, which serve to control the viscosity of the fluids. Typical viscoelastic surfactants are N-erucyl-N, N-bis(2-hydroxyethyl)-N-methyl ammonium chloride and potassium oleate, solutions of which form gels when mixed with corresponding activators such as sodium salicylate and potassium chloride.

Conventional surfactant molecules are characterized by having one long hydrocarbon chain per surfactant headgroup. In the viscoelastic gelled state these molecules aggregate into worm-like micelles. Gel breakdown occurs rapidly when the fluid contacts hydrocarbons which cause the micelles to change structure or disband.

In practical terms the surfactants act as reversible thickening agents so that, on placement in subterranean reservoir formations, the viscosity of a wellbore fluid containing such a surfactant varies significantly between water- or hydrocarbon-bearing zones of the formations. In this way the fluid is able preferentially to penetrate hydrocarbon-bearing zones.

N-erucyl-N, N-bis(2-hydroxyethyl)-N-methyl ammonium chloride is a waxy solid at room temperature that is difficult to dissolve in water. It is conventional to deliver it to the wellhead in the form of a concentrated solution in isopropyl alcohol. This is then mixed with water (and other additives) to form the treatment fluid.

Potassium oleate, on the other hand, is usually formed in situ by the on-line mixing oleic acid and potassium hydroxide solutions. However, the transportation and subsequent rigsite pumping of concentrated potassium (or sodium) hydroxide solution is potentially hazardous and the exothermic acid-base reaction may result in excessive heating.

The application of viscoelastic surfactants in both non-foamed and foamed fluids used for fracturing subterranean formations has been described in several patent applications and patents, e.g. EP-A-0835983, U.S. Pat. No. 5,258,137, U.S. Pat. No. 5,551,516, U.S. Pat. No. 5,964,295 and U.S. Pat. No. 5,979,557.

The use of viscoelastic surfactants for water shut off treatments and for selective acidizing is discussed in GB-A-2332224 and Chang F. F., Love T., Affeld C. J., Blevins J. B., Thomas R. L. and Fu D. K., "Case study of a novel acid diversion technique in carbonate reservoirs", Society of Petroleum Engineers, 56529, (1999).

U.S. Pat. No. 5,981,446 discloses a method of producing a fracturing fluid by the addition of a dry mix blend to the mixed water being pumped into a well. However, the viscoelasticity of the fracturing fluid was generated by the dissolution and subsequent crosslinking of a water-soluble polysaccharide, and not by surfactant molecules. Also, ensuring adequate hydration of the polymer and providing sufficient energy to mix the blend into the mixed water is problematic for polymer-forming blends.

DEFINITIONS

The terms "carbo", "carbyl", "hydrocarbo" and "hydrocarbyl", when used herein, pertain to compounds and/or groups which have only carbon and hydrogen atoms.

The term "saturated" when used herein, pertains to compounds and/or groups which do not have any carbon-carbon double bonds or carbon-carbon triple bonds.

The term "unsaturated" when used herein, pertains to compounds and/or groups which have at least one carbon-carbon double bond or carbon-carbon triple bond.

The term "aliphatic", when used herein, pertains to compounds and/or groups which are linear or branched, but not cyclic (also known as "acyclic" or "open-chain" groups).

The term "cyclic", when used herein, pertains to compounds and/or groups which have one ring, or two or more rings (e.g., spiro, fused, bridged). Compounds with one ring may be referred to as "monocyclic" or "mononuclear" whereas compounds with two or more rings may be referred to as "polycyclic" or "polynuclear".

The term "ring", when used herein, pertains to a closed ring of from 3 to 10 covalently linked atoms, more preferably 3 to 8 covalently linked atoms.

The term "aromatic ring", when used herein, pertains to a closed ring of from 3 to 10 covalently linked atoms, more preferably 5 to 8 covalently linked atoms, which ring is aromatic.

The term "heterocyclic ring", when used herein, pertains to a closed ring of from 3 to 10 covalently linked atoms, more preferably 3 to 8 covalently linked atoms, wherein at least one of the ring atoms is a multivalent ring heteroatom, for example, nitrogen, phosphorus, silicon, oxygen, and sulfur, though more commonly nitrogen, oxygen, and sulfur.

The term "alicyclic", when used herein, pertains to compounds and/or groups which have one ring, or two or more rings (e.g., spiro, fused, bridged), wherein said ring(s) are not aromatic.

The term "aromatic", when used herein, pertains to compounds and/or groups which have one ring, or two or more rings (e.g., fused), wherein said ring(s) are aromatic.

By "powder" we mean a form of solid matter composed of discrete, solid units which may be e.g. particles, grains, pellets or tablets.

By "viscoelastic" we mean that the elastic (or storage) modulus G' of the fluid is greater than the loss modulus G" as measured using an oscillatory shear rheometer (such as a Bohlin CVO 50) at a frequency of 1 Hz and at 20° C. The measurement of these moduli is described in *An Introduction to Rheology*, by H. A. Barnes, J. F. Hutton, and K. Walters, Elsevier, Amsterdam (1997).

By "viscoelastic surfactant" we mean surfactant that, in solution, is capable of forming a viscoelastic fluid.

By "straight chain" we mean a chain of consecutively linked atoms, all of which or the majority of which are carbon atoms. Side chains may branch from the straight chain, but the number of atoms in the straight chain does not include the number of atoms in any such side chains.

By an "oligomeric" or "oligomer" surfactant we mean that the structure of the surfactant is based on from two to eight (and preferably two to five) linked surfactant monomer subunits, each monomer subunit having a polar head group (which may be a cationic, anionic or zwitterionic group) and a $C_{10}$-$C_{50}$ organic (i.e. aliphatic, alicyclic or aromatic) tail group bonded at a terminal carbon atom thereof to the head group. Preferably the $C_{10}$-$C_{50}$ organic tail group is a hydrocarbyl tail group. The monomer subunits are linked in the oligomer either head group-to-head group or tail group-to-tail group. When they are linked head group-to-head group, the oligomer has distinct tail groups corresponding to the tail groups of the monomer subunits and a super-head group formed from the plural head groups of the monomer subunits. When they are linked tail group-to-tail group, the oligomer has distinct head groups corresponding to the head groups of the monomer subunits and a super-tail group formed from the plural tail groups of the monomer subunits.

Although the oligomer is defined above in relation to a chemically-corresponding monomer subunit, in practice the oligomer surfactant may not necessarily be synthesised from that monomer. For example, a synthesis route may be adopted in which monomer subunits are first oligomerised and the head groups are then changed to those of the desired oligomer surfactant. That is the head groups of the monomer subunits used in practice to form the oligomer may be different from the head groups of the monomer subunits to which the oligomer chemically corresponds. In another example, if the tail groups of the monomers actually used to form the oligomer are unsaturated, the oligomerisation process may involve the partial or total hydrogenation of those groups, particularly if the tail groups are linked in the oligomer.

Furthermore the tail groups of the monomer units actually used to form the oligomer may be aliphatic, but if the monomer units are linked in the oligomer tail group-to-tail group, the links formed between the tail groups in the super-tail group may be aliphatic, alicyclic or aromatic.

SUMMARY OF THE INVENTION

In a first aspect the present invention provides a powder composition for forming, in aqueous solution, a viscoelastic wellbore treatment fluid, the composition comprising viscoelastic surfactant.

By providing a powder composition for forming the treatment fluid, wellhead storage of the surfactant can be simplified and made less expensive. For example, large costs are associated with the safe storage, in sometimes remote regions of the world, of large quantities of conventional liquids for forming treatment fluids. The costs are particularly high for potentially harmful liquids such as sodium hydroxide solution. Also, environmental consequences are generally more serious for the accidental spillage of a liquid than a powder because of the relative difficulty of containing a spilled liquid.

Compared with a liquid-based composition, a powder composition, particularly when it is free-flowing, is still relatively easy to handle, e.g. when it is added to the treatment fluid mix water. Also, compared with the dry mix blend of U.S. Pat. No. 5,981,446, a powder composition based on a viscoelastic surfactant readily dissolves into solution, i.e. the problems associated with polymer mixing, hydration and cross-linking can be avoided.

In one embodiment, at least 50% (by volume) of the powder has a particle size of 500 µm or less (preferably 300 µm or less).

Preferably the solubility of the powder is such that 42 g of the powder substantially completely dissolves in 700 ml of pure water in 200 s or less (preferably 100 s or less) at 25° C. with stirring (e.g. at 500 rpm using, for example, a EURO-ST D S2 stirrer obtainable from IKA Laboratory Technik).

The composition may comprise at least five weight percent of viscoelastic surfactant, and preferably at least 15 weight percent. In one embodiment the composition comprises substantially only viscoelastic surfactant.

Preferably the composition comprises an effective amount, relative to the amount of viscoelastic surfactant, of a thickening activator (e.g. an alkali metal salt) for activating viscoelastic thickening of the treatment fluid. In this way the appropriate amount of thickening activator can be pre-dosed in the composition, avoiding the inconvenience of determining, measuring out and adding the appropriate amount of activator at the wellhead. Pre-dosing also helps to improve quality control. The composition may comprise at least 60 weight percent of the thickening activator.

Preferably the viscoelastic surfactant includes at least one oligomeric surfactant based on linked surfactant monomer subunits, each monomer subunit having the formula ($R_1$—$X)_p$ $Z_m$ or $R_1$—Y; where X is a charged head group, Y is a zwitterionic polar headgroup (such as —$N^+$ $(CH_3)_2$—$CH_3$—$COO^-$ or —$N^+$ $(CH_3)_2$—$CH_3$—$OSO_3^-$), $R_1$ is a $C_{10}$-$C_{50}$ organic (preferably hydrocarbyl and/or aliphatic) tail group comprising a $C_{10}$-$C_{25}$ (preferably $C_{15}$-$C_{24}$) straight chain bonded at a terminal carbon atom thereof to respectively X or Y, Z is a counterion such as an alkali metal cation, and p and m are integers which ensure that the surfactant monomer is charge neutral.

The organic tail group may comprise only the straight chain. The straight chain may be a hydrocarbyl chain. In one embodiment the monomer straight chain is unsaturated. Preferably the oligomer is a dimer or a trimer.

X may be a carboxylate (—$COO^-$), sulphate (—$OSO_3^-$), sulphonate (—$SO_3^-$), phosphate (—$OPO_3^{2-}$), or a phosphonate (—$PO_3^{2-}$) charged group. For the avoidance of doubt, it is hereby stated that when X is a carboxylate group the carbon atom of the carboxylate group is not counted with the carbon atoms of the organic group. The surfactant monomer may be a salt of oleic acid.

In a second aspect the present invention provides for the use of the composition of the first aspect of the invention for forming a viscoelastic wellbore treatment fluid.

BRIEF DESCRIPTION OF THE DRAWINGS

The application file contains at least one drawing executed in color. Copies of this patent or patent application publication with color drawings will be provided by the Office upon request and payment of the necessary fee.

Specific embodiments of the present invention will now be described with reference to the following drawings in which.

DETAILED DESCRIPTION

A controlled stress rheometer (Bohlin model type CVO-50) was used to measure the rheological properties of solutions formed from the powder compositions discribed below. Using a concentric cylinders (Couette) geometry (inner radius of the outer cylinder, $R_i$=1.375 cm, outer radius of the inner cylinder, $R_O$=1.25 cm, and inner cylinder length=3.78 cm), corresponding to the geometry of German DIN standard 53019, the viscosity of each solution was measured at several applied shear stresses within a specified range. The typical range of shear stress was 0.5-40 Pa corresponding to a shear rate range of 0.005 to 1000 s$^{-1}$. Measurements were made at increasing and then decreasing shear rate. Typically, the complete set of measurements consisted of 40 viscosity measurements, each taken after a delay time of 10 seconds at constant shear stress and shear rate.

For the particular geometry of the rheometer, the shear rate was calculated as:

$$\dot{\gamma} = \frac{RPM \cdot 2\pi}{60} \frac{2 \cdot R_i^2 R_o^2}{\left(\frac{R_i + R_o}{2}\right)^2 (R_o^2 - R_i^2)},$$

where RPM is the relative rotational speed (in revolutions per minute) of the cylinders. The viscosity was then obtained for each measurement by dividing the measured stress by the calculated shear rate.

The oligomerisation of oleic acid generally leads to the production of complex mixtures of dimeric and trimeric products. Commercially available oligomers, suitable for putting the present invention into operation, are the Empol™ series of dimer and trimer mixtures from Henkel Corporation's Chemical Group (4900 Este Avenue-Bldg 53, Cincinnati, Ohio 45232, U.S.A.). Alternative suppliers of suitable mixtures are e.g. Uniqema (PO Box 90, Wilton Center, Middleborough, Cleveland TS90 8JE, UK), Union Camp (Vigo Lane, Chester-le-Street. Co. Durham DH3 2RB, UK) and Expo Chemical Company Inc. (12602 Manorwood, Cypress (Houston), Tex. 77429, U.S.A.).

FIGS. 1a-e show typical chemical structures of dimeric components of these mixtures. Clearly the components can have different degrees of hydrogenation. Although these commercially available products are in fact based on mixtures of oligomers, for convenience they are referred to below as if they were based on one particular dimer or trimer.

COMPARATIVE EXAMPLE

Hydrogenated oleic acid dimer (product number 1009) supplied by Uniqema, and hereafter referred to as U1009, was used to produce a viscoelastic surfactant solution.

Figure 1:
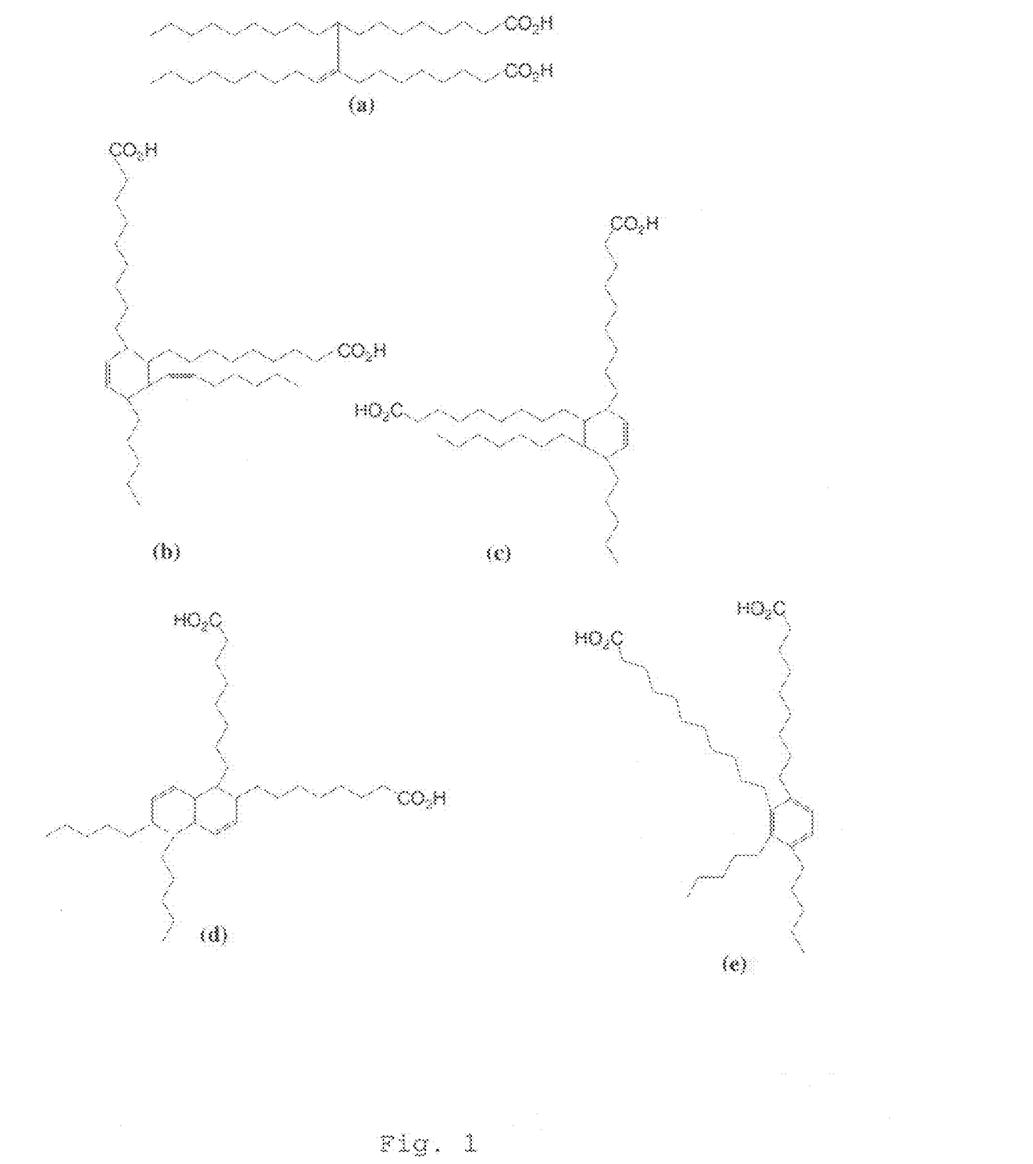
FIGS. 1a-e show typical chemical structures of dimeric components of oleic acid oligomer mixtures.
Figure 2:
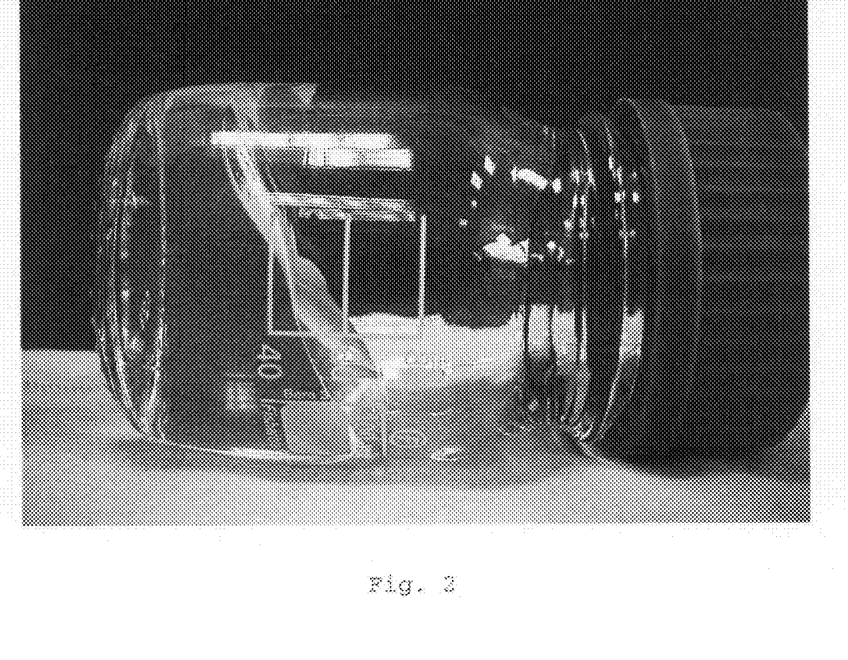
FIG. 2 shows a bottle containing a gelled viscoelastic solution containing 3 weight percent U1009 and 8 weight percent KCl.

An aqueous solution of potassium oleate dimer was formed by the addition of the liquid U1009 to a solution of potassium hydroxide. The extent of the reaction was monitored by measuring pH, substantially fully converted potassium oleate oligomer solution having a pH in the range 8-9. Subsequently, potassium chloride (thickening agent) was added to produce a solution containing 3 weight percent potassium oleate dimer and 8 weight percent KCl. This resulted in the generation of a clear viscoelastic surfactant solution shown in FIG. 2. The rheology of the solution, illustrated by the graph of FIG. 3, demonstrates its suitability for use as a wellbore treatment fluid.

EXAMPLES

Next, a concentrated (25 weight percent) aqueous solution of the potassium form of U1009 was generated by neutralisation of the acid with 2 mole equivalents of potassium hydroxide. This solution was dehydrated in an oven at 110° C., and the U1009 potassium salt (hereafter termed K1009) was obtained as a white crystalline solid, which was then ground-up to form a free-flowing white powder. Addition of potassium chloride to this powder resulted in the formation of a powder composition which, when hydrated, immediately formed a viscoelastic surfactant solution suitable for applications such as fracturing.

Figure 4:
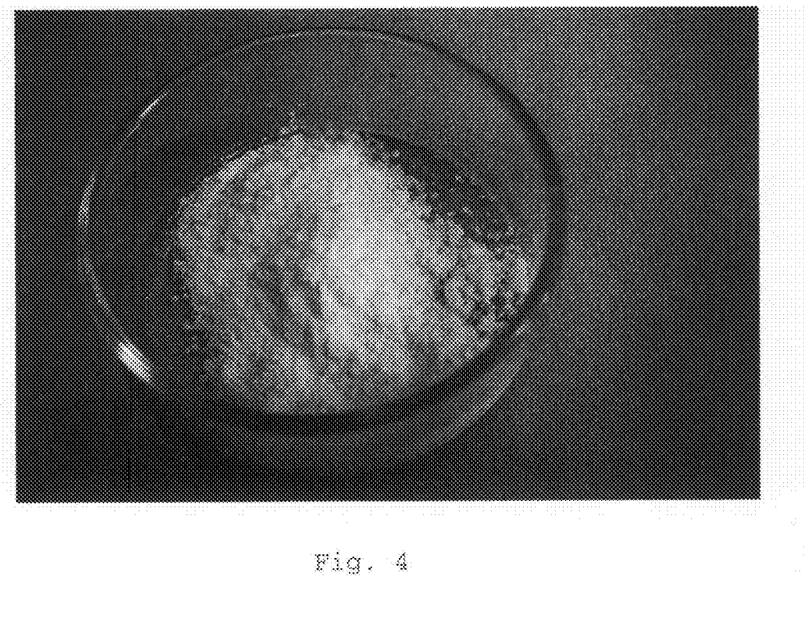
FIG. 4 shows a dry blend powder mixture of K1009 and KCl in the ratio 3:8 by weight percent.

For example, powdered K1009 and potassium chloride were mixed in the ratio 3:8, by weight percent. This resulted in the formation of a white powder (FIG. 4). When this powder was mixed with water (89 g), a clear, homogeneous, viscoelastic surfactant solution was formed within a few seconds which was visually identical to the gel shown in FIG. 2. The rheology of the gel could be controlled by varying the surfactant:salt ratio and/or the concentration of the surfactant-salt mixtures added to the water.

Figure 3:
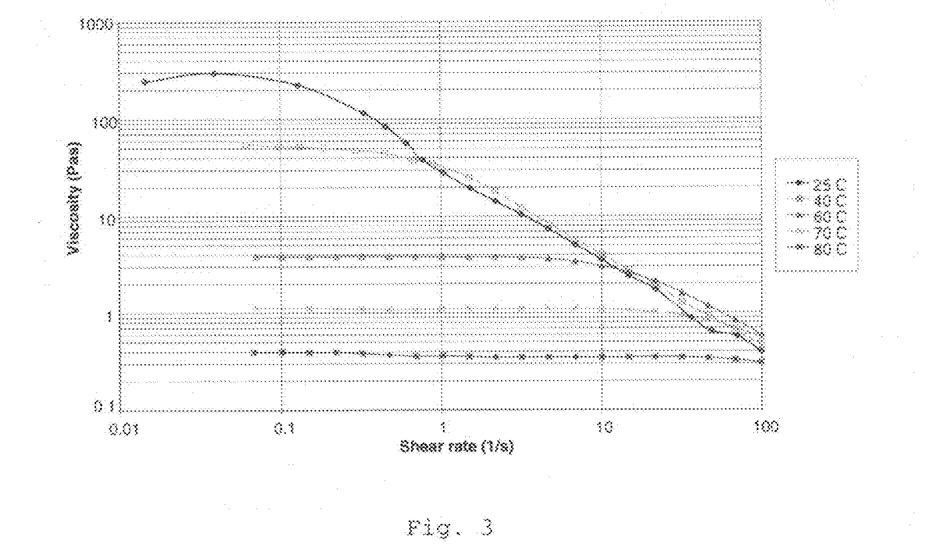
FIG. 3 shows the dependence, at five temperatures in the range 25-80° C., of the viscosity on shear rate of the solution of FIG. 2.
Figure 5:
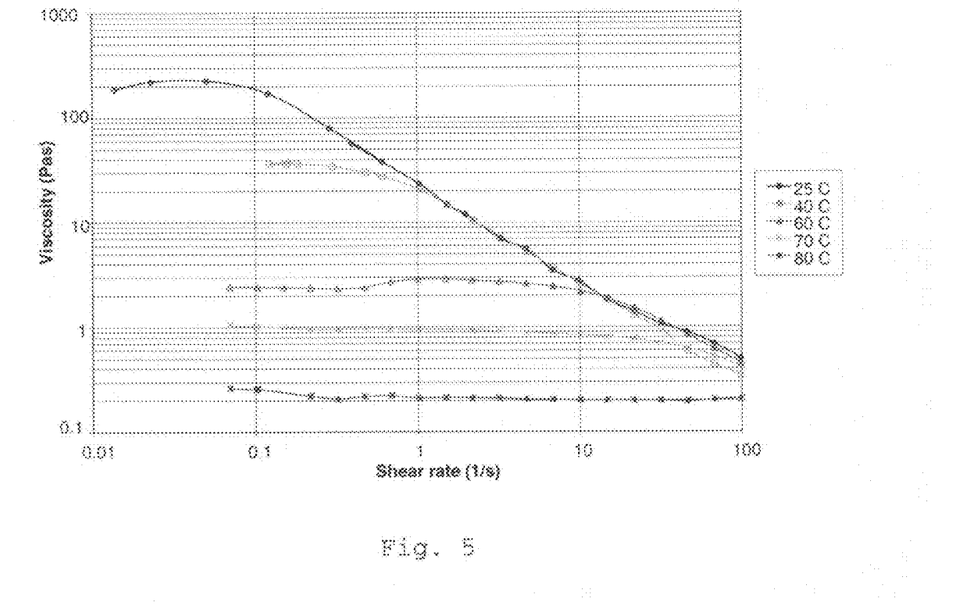
FIG. 5 shows the dependence, at five temperatures in the range 25-80° C., of the viscosity on shear rate of a solution formed from the mixture of FIG. 4, the solution containing 3 weight percent K1009 and 8 weight percent KCl.

The rheology (see FIG. 5) of a gel formed using this procedure can be compared to the corresponding gel formed by in situ neutralisation of 3 weight percent U1009 and subsequent addition of salt (FIG. 3). Although the gel of FIG. 5 appears marginally weaker than that of FIG. 3, this is explained by the fact that, in molar terms, 3 weight percent U1009 is greater than 3 weight percent K1009. So the solution based on U1009 is more concentrated in surfactant than the K1009 system and is expected to exhibit slightly higher viscosities.

The surfactant gels generated by the two different methods behave in the same manner in all respects, including their behaviour towards hydrocarbons. Both gels break readily when contacted with oil and the resulting two-phase systems do not form stable emulsions.

The hydration of K1009 is rapid and comparable to the rate of hydration of potassium chloride. This allows the rapid preparation of a viscoelastic surfactant solution from a single composition without compromising gel strength, oil sensitivity or any of the other properties associated with treatment fluids.

Figure 6:
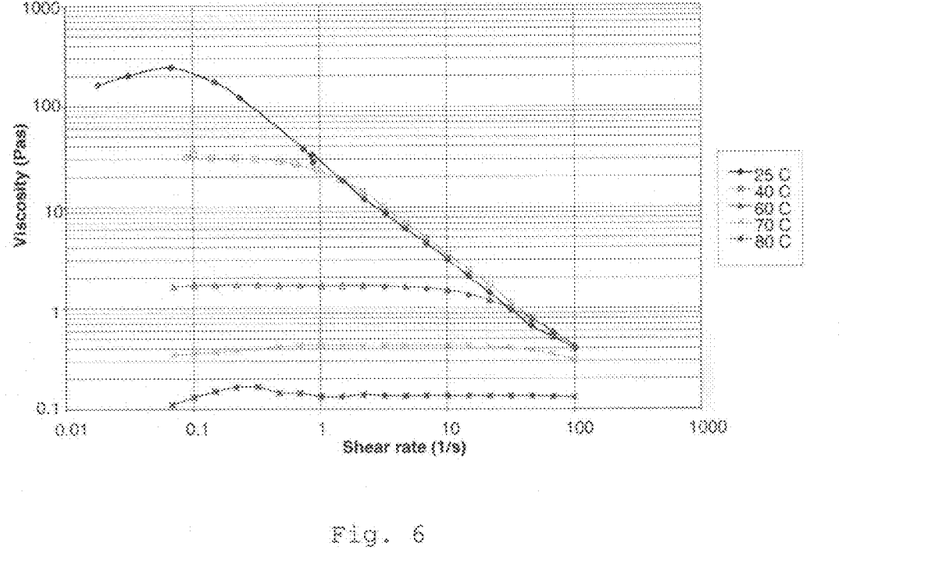
FIG. 6 shows the dependence, at five temperatures in the range 25-80° C., of the viscosity on shear rate of a solution formed from a dry blend powder mixture of K1009 and potassium formate, the solution containing 3 weight percent K1009 and 8 weight percent potassium formate.

Although in the above example potassium chloride was used as the thickening agent, other salts such as potassium formate, potassium tartrate, potassium sulphate, potassium hydroxide and cesium chloride are effective. Mixtures of salts can be used to alter the rheological properties of the gel and give the desired performance. The gel rheology of a surfactant solution formed from a dry powder blend of potassium formate and K1009, and containing in the solution 6.78 weight percent potassium formate and 3 weight percent K1009, is shown in FIG. 6. Surfactant-formate systems could have uses in situations where chlorides would cause corrosion problems or are perceived as an environmental issue.

Potassium salts of other oligomer oleic acids, such as the dimer acids Empol™ 1016 and Empol™ 1018 and the trimer acid Empol™ 1040, all of which are manufactured by the Henkel Corporation, were used to generate powdered surfactants in the same way as K1009. The powders also formed viscoelastic surfactant solutions having the properties required of wellbore treatment fluids. A particular advantage of using powders based on these salts is that the (potentially dangerous) exothermic neutralisation of oleic acid at the wellhead is avoided.

Figure 7:
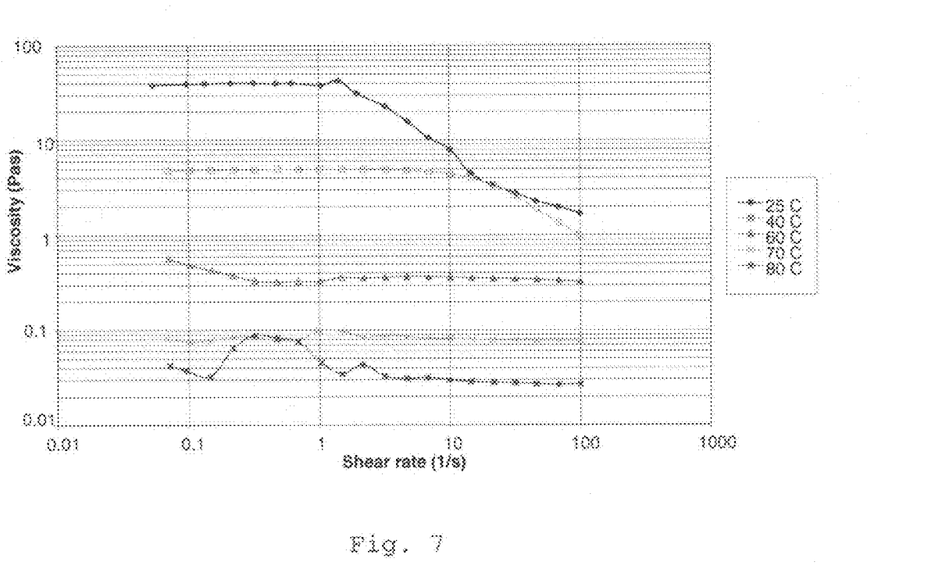
FIG. 7 shows the dependence, at five temperatures in the range 25-80° C., of the viscosity on shear rate of a solution formed from a dry blend powder mixture of cetylpyridinium chloride and sodium salicylate, the solution containing 5 weight percent cetylpyridinium chloride and 1.6 weight percent sodium salicylate.

The approach described above is not limited to anionic oligomer surfactants. We have formulated a powder composition by mixing powdered cetylpyridinium chloride (5 g) and powdered sodium salicylate (1.6 g), cetylpyridinium chloride being a cationic monomer surfactant. This composition, when dissolved in water (93.4 g), formed a viscoelastic surfactant solution whose rheology is shown in FIG. 7. Although the high temperature rheological performance of the solution is somewhat lower than that of the solutions based on carboxylate oligomers, such a solution may find use in wellbore treatment fluids for low temperature wells.

An important practical characteristic of the powder surfactant is its rate of dissolution. This can be measured under standard conditions to give an indication of dissolution rate, but in practice the rate of dissolution will also depend on factors such as the shear rate of the water into which it is mixed and the shear rate of the mixing process, which may themselves be a function of the developing viscosity of the solution.

Figure 8:
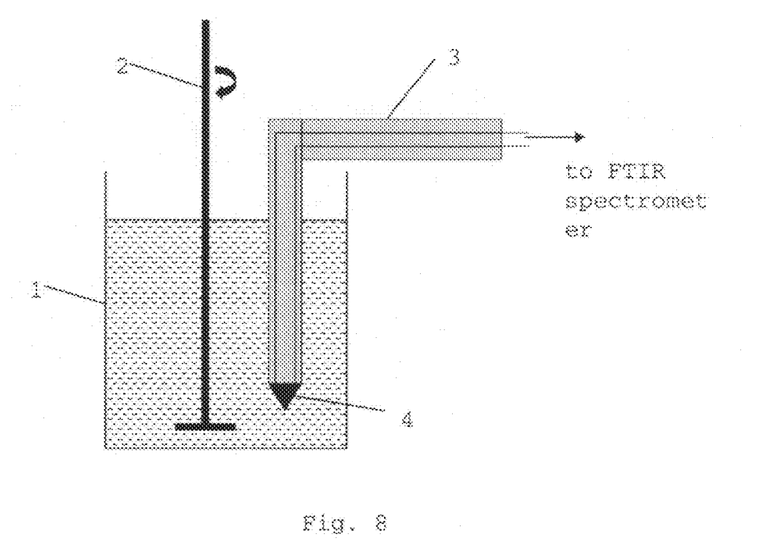
FIG. 8 shows the experimental set up used for measuring the dissolution rate of the powdered surfactant.

The rate of dissolution of powdered K1009 in water under standard conditions was measured using infrared spectroscopy. FIG. 8 shows the experimental set up. The surfactant powder (42.0 grams) was placed in a beaker 1 containing 700 ml of pure water at 25° C., and stirred with a EURO-ST D S2 stirrer 2 (IKA Laboratory Technik) operating at mixing rate of 500 rpm. The infrared spectra of the stirred solution were collected using a light pipe 3 (Axiom, Calif.) connected to a Fourier transform infrared (FTIR) spectrometer (Nicolet 800 FTIR spectrometer—not shown). The infrared radiation was transmitted to and from a 45° zinc selenide attenuated total reflectance (ATR) crystal 4 by means of gold-coated pipes. Spectra were collected automatically over a fixed time interval and allowed the rate of dissolution of the surfactant to be determined by the appearance of characteristic spectral bands in the infrared spectrum of the solution.

Figure 9:
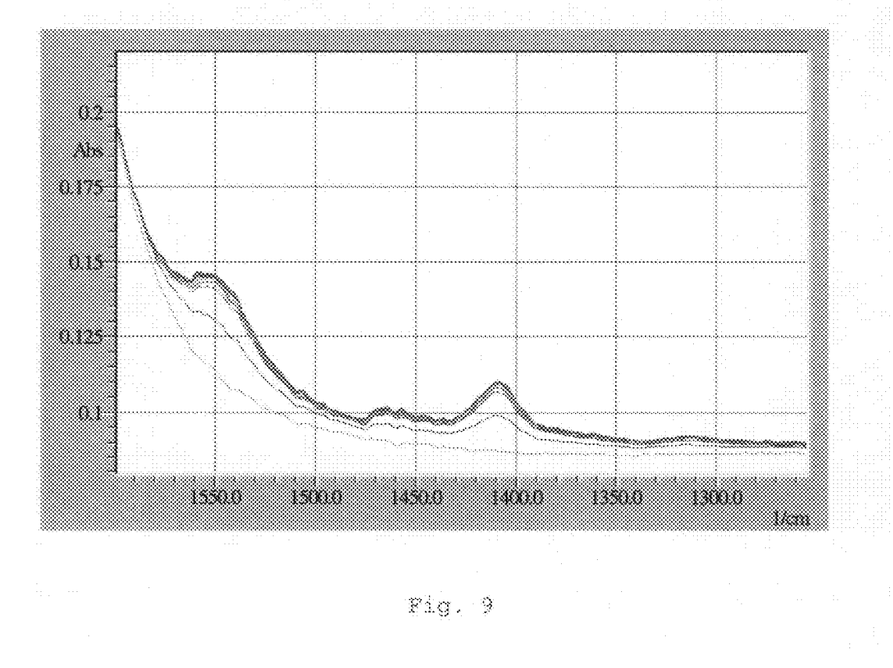
FIG. 9 shows the evolution of the K1009 solution infrared spectrum collected using the set up of FIG. 8.
Figure 10:
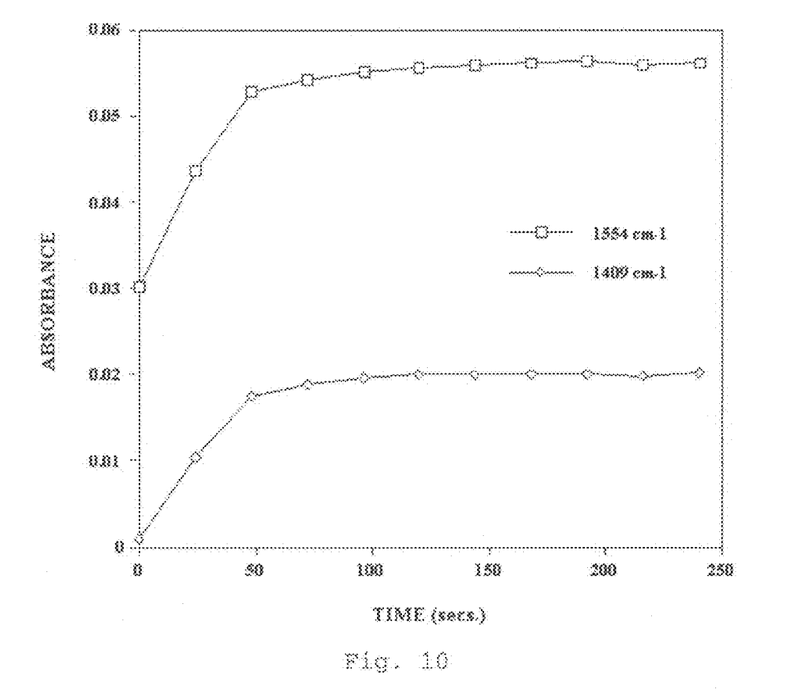
FIG. 10 shows the time dependence of the absorbance at 1554 and 1409 cm$^{-1}$ of the K1009 solution infrared spectrum collected using the set up of FIG. 8.

FIG. 9 shows the evolution of the K1009 infrared spectrum collected in this way over a period of 24 s. The dissolution of the surfactant is indicated by the growth of the C—O stretching bands of the carboxylate anion (—$CO_2^-$) at 1554 and 1409 $cm^{-1}$. FIG. 10 shows the time dependence of the absorbance at 1554 and 1409 $cm^{-1}$ (relative to a local baseline at 1275 $cm^{-1}$) for the dissolution reaction. It is clear that the powder had substantially completely dissolved after 100 seconds (and this was confirmed by visual inspection).

Such a rate of dissolution indicates that the K1009 powder should be practically usable under a wide range of conditions.

Figure 11:
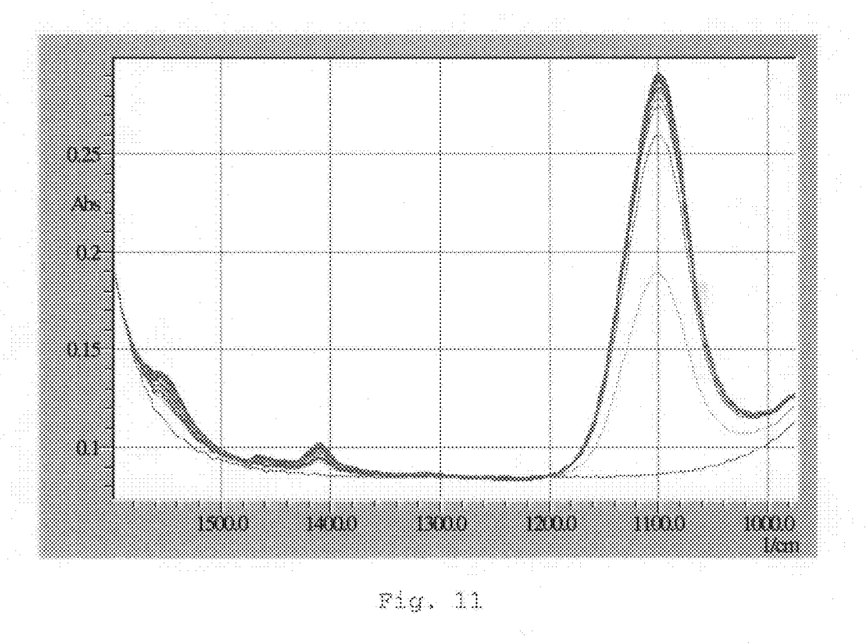
FIG. 11 shows the evolution of the K1009 and potassium sulphate solution infrared spectrum collected using the set up of FIG. 8.
Figure 12:
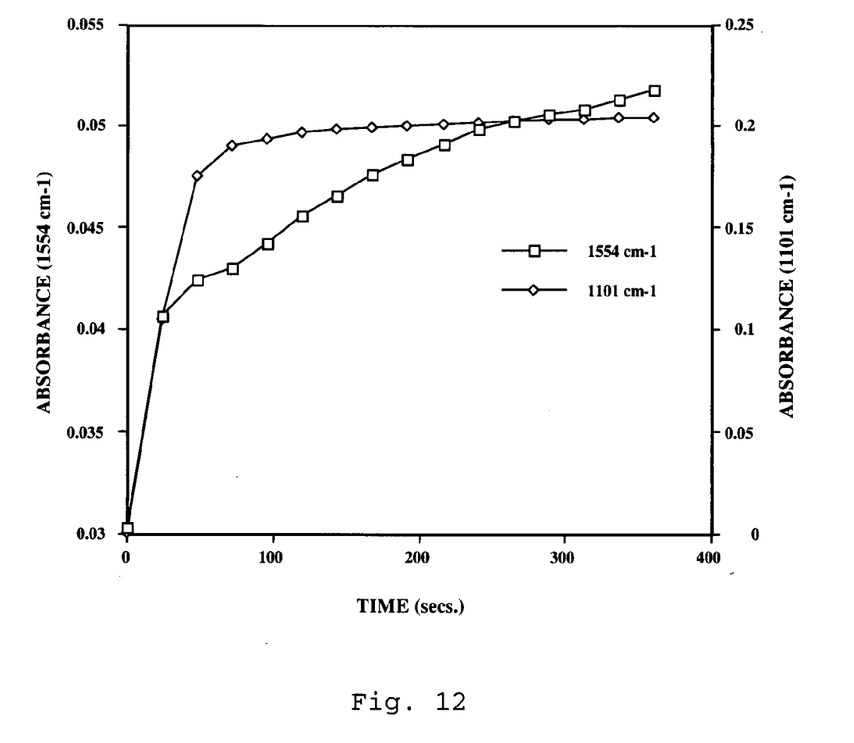
FIG. 12 shows the time dependence of the absorbance at 1554 and 1101 cm$^{-1}$ of the K1009 and potassium sulphate solution infrared spectrum collected using the set up of FIG. 8.

For example, the rate of dissolution experiment was repeated but with 65.8 g of potassium sulphate added to the water. FIG. 11 shows the evolution of the infrared spectra of the solution. The band at 1101 $cm^{-1}$ is due to the S—O stretching of the sulphate ion in solution. FIG. 12 compares the rates of growth of the 1554 $cm^{-1}$ carboxylate band from the K1009 and the 1101 $cm^{-1}$ sulphate band from the potassium sulphate. The potassium sulphate dissolved in water over a time scale of about 100 seconds, which was comparable to the previously measured dissolution rate of K1009 (FIG. 9). The rate of dissolution of K1009 was slower in the potassium sulphate solution than in pure water due to the earlier development of viscosity. However, even at the modest mixing rate of 500 rpm the surfactant dissolved into a highly viscous solution over a time scale of about only 6 minutes.

A useful characteristic of the solid forms of the surfactants described above is that they are readily ground to form fine powders. For example, lithium, sodium and potassium forms of U1009 form dry solids can all be processed to a fine powder. In general, the smaller the particle size of the powder, the more rapidly it will dissolve in water.

Figure 13:
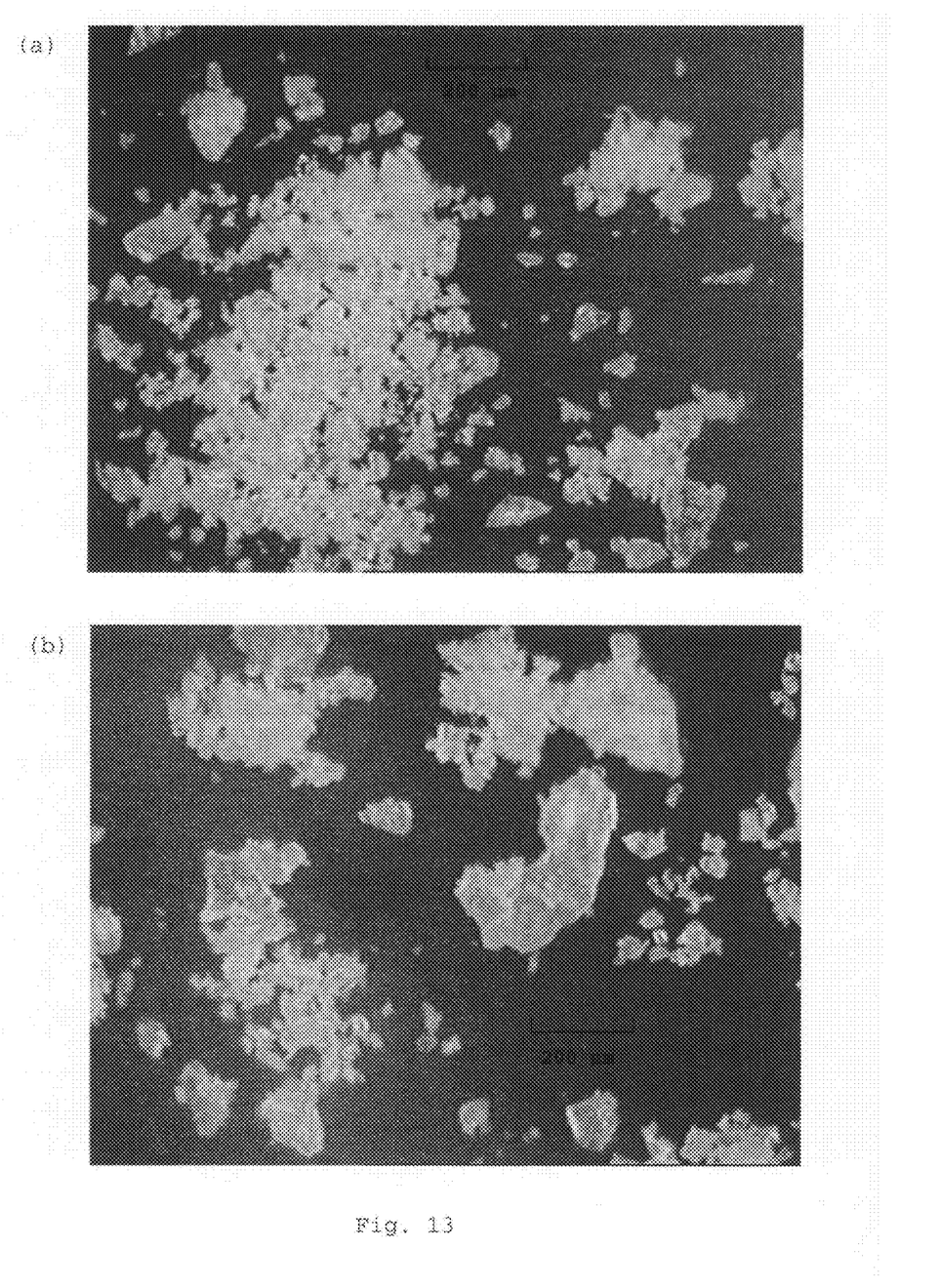
FIG. 13 shows photomicrographs of powdered forms of (a) the sodium salt of U1009 (Na1009) and (b) K1009, and FIG. 14 compares the particle size distributions of the powdered K1009 and Na1009 of FIG. 13.

FIG. 13a shows a photomicrograph of a powdered form of the sodium salt of U1009 (hereafter termed Na1009) and FIG. 13b shows a photomicrograph of powdered K1009. In both photomicrographs the scale bar is 200 μm. Na1009 was formed, like K1009, by neutralising a solution of U1009 with sodium hydroxide. The typical particle size of the sodium surfactant is in the range 10-200 μm, while the corresponding size range for the potassium surfactant is 10-400 μm. Note the crystalline appearance of many of the grains.

The particle size distributions of the powdered forms of K1009 and Na1009 were measured using a Malvern Mastersizer Microplus (Malvern Instruments, Malvern, Worcs., UK). Heptane (approximately 500 ml) was pumped through the Malvern Mastersizer at a rate of 2000 rpm and approximately 1 gram of the respective surfactant was slowly added. The surfactant powder was dispersed into the heptane using short bursts of high-power ultrasound delivered by a small ultrasonic transducer immersed in the solvent. The particle size distributions were obtained from an average of two separate measurements. The Mastersizer was cleaned thoroughly with several washes of heptane before and after each measurement.

Figure 14:
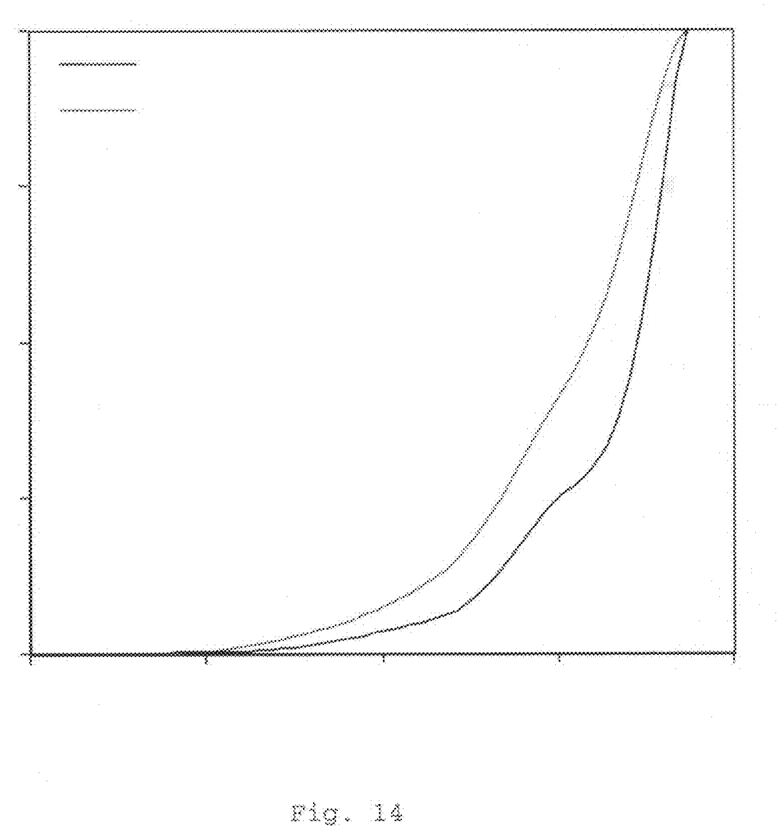

FIG. 14 compares the particle size distributions of powdered K1009 and Na1009. The size of the surfactant particles falls within the range 0.5-500 μm, with 50% of the volume of the potassium and sodium forms occurring respectively below 260 μm and 150 μm. The particle size distributions show that the mean particle size of the sodium form is below that of the potassium form, which is consistent with the sizes of particles observed in the photomicrographs of FIG. 13. The particle size distributions of the powdered surfactant may controlled during the grinding process.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A powder composition for forming, in aqueous solution, a viscoelastic wellbore treatment fluid, the powder composition comprising:
    a viscoelastic surfactant, the viscoelastic surfactant comprising at least one oligomeric surfactant containing at least two linked surfactant monomer subunits, each monomer subunit having the formula $R_1$—Y;

where Y is a zwitterionic polar headgroup, and $R_1$ is a $C_{10}$-$C_{50}$ organic tail group comprising a $C_{10}$-$C_{25}$ straight chain bonded at a terminal carbon atom thereof to Y, wherein:

the powder composition is stable and free flowing at ambient temperatures; and the powder composition is configured to produce a viscous surfactant solution that exhibits viscoelasticity upon mixing with an aqueous solution.

2. A powder composition according to claim 1, wherein at least 50% (by volume) of the powder has a particle size of 500 μm or less.

3. A powder composition according to claim 1, wherein the solubility of the powder is such that 42 g of the powder substantially completely dissolves in 700 ml of pure water in 200 s or less at 25° C. with stirring.

4. A powder composition according to claim 1, comprising at least five weight percent of the viscoelastic surfactant.

5. A powder composition according to claim 1, comprising substantially only the viscoelastic surfactant.

6. A powder composition according to claim 1, further comprising a thickening activator for activating viscoelastic thickening of the treatment fluid.

7. A powder composition according to claim 6, comprising at least 60 weight percent of the thickening activator.

8. A powder composition according to claim 6, wherein the thickening activator is a salt of an alkali metal.

9. A powder composition according to claim 1, wherein each monomer subunit is a salt of oleic acid.

10. A powder composition according to claim 1, wherein the straight chain within each monomer subunit is a $C_{15}$-$C_{24}$ chain.

11. A powder composition according to claims 1, wherein the $R_1$ group within each monomer subunit comprises only the straight chain.

12. A powder composition according to claim 1, wherein the straight chain within each monomer subunit is unsaturated.

13. A powder composition according to claim 1, wherein the oligomer is a dimer or a trimer.

14. A powder composition for forming, in aqueous solution, a viscoelastic wellbore treatment fluid, the powder composition comprising:

a viscoelastic surfactant, the viscoelastic surfactant comprising at least one oligomeric surfactant containing at least two linked surfactant monomer subunits, each monomer subunit containing an ionic headgroup and a $C_{10}$-$C_{50}$ organic tail group comprising a $C_{10}$-$C_{25}$ straight chain; wherein:

the powder composition is stable and free flowing at ambient temperatures; and the powder composition is configured to produce a viscous surfactant solution that exhibits viscoelasticity upon mixing with an aqueous solution.

15. A powder composition according to claim 14, wherein at least 50% (by volume) of the powder has a particle size of 500 μm or less.

16. A powder composition according to claim 14, comprising substantially only the viscoelastic surfactant.

17. A powder composition according to claim 14, further comprising at least 60 weight percent of a thickening activator for activating viscoelastic thickening of the treatment fluid.

18. A powder composition according to claim 17, wherein the thickening activator is a salt of an alkali metal.

19. A powder composition according to claim 14, wherein the straight chain within each monomer subunit is a $C_{15}$-$C_{24}$ chain.

20. A powder composition according to claim 14, wherein the oligomer is a dimer or a trimer.

* * * * *